US010863732B2

(12) United States Patent
Rich et al.

(10) Patent No.: US 10,863,732 B2
(45) Date of Patent: *Dec. 15, 2020

(54) WIRELESS NOTIFICATION SYSTEMS AND METHODS FOR ELECTRONIC RODENT TRAPS

(71) Applicant: WOODSTREAM CORPORATION, Lititz, PA (US)

(72) Inventors: Christopher T. Rich, Leola, PA (US); Thomas J. Daly, Jr., Lititz, PA (US); Aaron W. Lunger, Lancaster, PA (US)

(73) Assignee: WOODSTREAM CORPORATION, Lititz, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/670,156

(22) Filed: Oct. 31, 2019

(65) Prior Publication Data

US 2020/0113173 A1    Apr. 16, 2020

Related U.S. Application Data

(63) Continuation of application No. 16/160,163, filed on Oct. 15, 2018, now Pat. No. 10,499,633, which is a
(Continued)

(51) Int. Cl.
*A01M 23/00* (2006.01)
*G08B 21/18* (2006.01)
(Continued)

(52) U.S. Cl.
CPC ............ *A01M 23/00* (2013.01); *A01M 23/38* (2013.01); *A01M 31/002* (2013.01);
(Continued)

(58) Field of Classification Search
CPC .... A01M 23/00; A01M 23/38; A01M 31/002; A01M 99/00; G08B 21/18; G08B 25/10;
(Continued)

(56) References Cited

U.S. PATENT DOCUMENTS 3,111,608 A    11/1963  Boenning et al.
5,610,595 A    3/1997   Garrabrant et al.
(Continued)

FOREIGN PATENT DOCUMENTS

WO    WO 03/084320      10/2003
WO    WO 2008/110801    9/2008
WO    WO 2010/030346    3/2010

*Primary Examiner* — Mohamed Barakat
(74) *Attorney, Agent, or Firm* — Jacobson Holman PLLC

(57) ABSTRACT

A remote notification electronic rodent trapping system and method is provided having a plurality of rearming electronic rodent trapping devices configured to wirelessly communicate trap information to a base station that is in communication with a cloud server. When a trap is activated by a rodent trigger it changes from a set state to a kill alert state and initiates a killing cycle. The trap waits a first time period and then sends a notification signal to the base station of trap activation which the base station forwards to the cloud server. The cloud server waits a second predetermined time period before sending a pushed notification to a remote user of the trap's kill alert state. If the trap rearms prior to expiration of the second time period, it alerts the base station which notifies the cloud server. The cloud server updates trap status to the set state and does not send a notification to the user.

19 Claims, 8 Drawing Sheets

Related U.S. Application Data continuation of application No. 15/668,958, filed on Aug. 4, 2017, now Pat. No. 10,111,416, which is a continuation of application No. 14/986,353, filed on Dec. 31, 2015, now Pat. No. 9,743,657, which is a continuation-in-part of application No. 14/866,072, filed on Sep. 25, 2015, now abandoned, which is a continuation of application No. 14/177,561, filed on Feb. 11, 2014, now abandoned, which is a continuation-in-part of application No. 13/626,224, filed on Sep. 25, 2012, now abandoned.

(51) Int. Cl.
| | | |
|---|---|---|
| *A01M 23/38* | (2006.01) | |
| *A01M 31/00* | (2006.01) | |
| *H04L 29/08* | (2006.01) | |
| *H04M 11/00* | (2006.01) | |
| *A01M 99/00* | (2006.01) | |
| *G08B 25/10* | (2006.01) | |
| *H04M 11/02* | (2006.01) | |
| *H04W 88/04* | (2009.01) | |

(52) U.S. Cl.
CPC ............ *A01M 99/00* (2013.01); *G08B 21/18* (2013.01); *G08B 25/10* (2013.01); *H04L 67/125* (2013.01); *H04M 11/00* (2013.01); *H04L 67/26* (2013.01); *H04M 11/022* (2013.01); *H04W 88/04* (2013.01); *Y04S 40/18* (2018.05)

(58) Field of Classification Search
CPC ...... H04L 67/125; H04L 67/26; H04M 11/00; H04M 11/022; Y04S 40/18; H04W 88/04
See application file for complete search history.

(56) References Cited

U.S. PATENT DOCUMENTS

| | | | |
|---|---|---|---|
| 6,836,999 | B2 | 1/2005 | Rich et al. |
| 7,219,466 | B2 | 5/2007 | Rich et al. |
| 7,317,399 | B2 | 1/2008 | Chyum |
| 7,333,395 | B2 | 2/2008 | Lewis |
| 7,401,436 | B2 | 7/2008 | Chyum |
| 7,690,147 | B2 | 4/2010 | Wetzel et al. |
| 7,757,430 | B2 | 7/2010 | Wetzel et al. |
| 7,970,871 | B2 | 6/2011 | Ewing et al. |
| 8,009,437 | B2 | 8/2011 | Shelton et al. |
| 8,204,971 | B2 | 6/2012 | Ewing et al. |
| 8,375,626 | B2 | 2/2013 | Borth |
| 8,599,026 | B2 | 12/2013 | Lloyd |
| 9,467,518 | B2 | 10/2016 | Perlmutter |
| 2002/0167409 | A1* | 11/2002 | Cristofori ............. A01M 23/04 340/573.2 |
| 2004/0093190 | A1 | 5/2004 | Beroza et al. |
| 2005/0044775 | A1 | 3/2005 | Rich |
| 2005/0097808 | A1* | 5/2005 | Vorhies ................. A01M 23/18 43/61 |
| 2005/0151653 | A1 | 7/2005 | Chan |
| 2007/0090946 | A1 | 4/2007 | Kates |
| 2007/0016401 | A1 | 7/2007 | Chyun |
| 2008/0204253 | A1 | 8/2008 | Cottee |
| 2008/0310850 | A1 | 12/2008 | Pederson |
| 2009/0172995 | A1 | 7/2009 | Wetzel |
| 2010/0115826 | A1* | 5/2010 | Kerr ...................... A01M 1/026 43/124 |
| 2010/0134301 | A1* | 6/2010 | Borth .................... A01M 1/026 340/573.2 |
| 2010/0146839 | A1* | 6/2010 | Cruz ..................... A01M 23/14 43/99 |
| 2013/0092099 | A1* | 4/2013 | Hardi .................. A01K 29/005 119/721 |

* cited by examiner

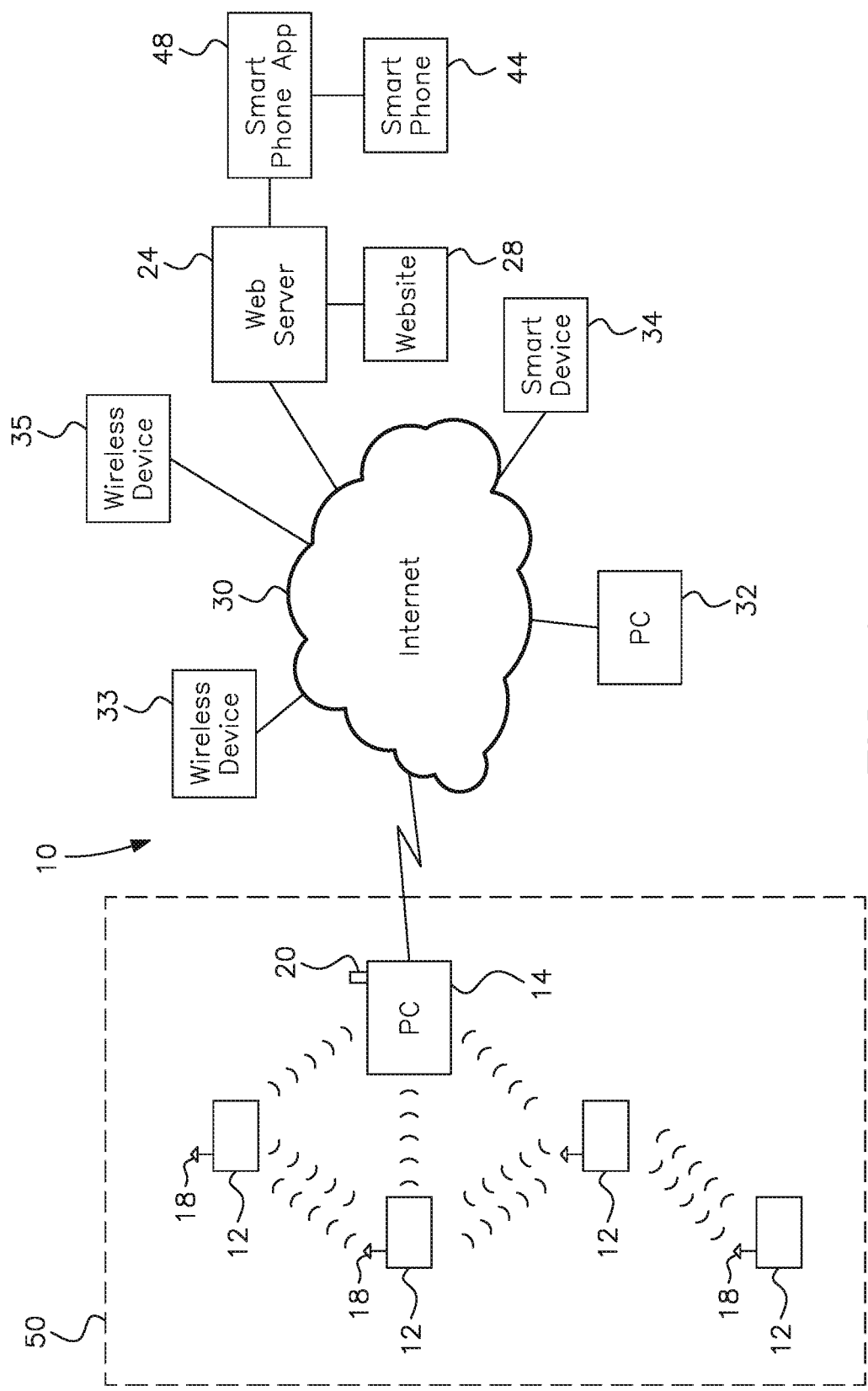

WIRELESS NOTIFICATION SYSTEMS AND METHODS FOR ELECTRONIC RODENT TRAPS

This application is a continuation of co-pending prior application Ser. No. 16/160,163 filed Oct. 15, 2018, which is a continuation of application Ser. No. 15/668,958 filed Aug. 4, 2017, which issued as U.S. Pat. No. 10,111,416 on Oct. 30, 2018, which is a continuation of application Ser. No. 14/986,353 filed on Dec. 31, 2015, which issued as U.S. Pat. No. 9,743,657 on Aug. 29, 2017, which is a continuation-in-part application of U.S. Ser. No. 14/866,072, filed on Sep. 25, 2015, which is a continuation application of U.S. Ser. No. 14/177,561 filed on Feb. 11, 2014, which is a continuation-in-part application of U.S. Ser. No. 13/626,224, filed on Sep. 25, 2012, the priority of which is hereby claimed.

BACKGROUND OF THE INVENTION

Field of the Invention

The present invention is related to the field of pest control and pest trap monitoring and, more particularly, to a remote notification electronic rodent trapping system and method having electronic rodent traps with wireless communication capability enabling remote monitoring of trap status.

Description of the Related Art

Rodent trap monitoring has typically required that the user come in close proximity to the trap to determine whether or not a rodent has been dispatched or the trap deactivated. Physically checking rodent traps can be inconvenient, particularly when the traps are located in a barn, attic, basement, crawl space, etc. Trap monitoring can also be very time consuming for users such as professional rodent control companies who place traps at multiple sites and then must physically visit each site on a regular basis to monitor the status of the traps and ensure traps are in an operational-ready state.

Additionally, when electronic animal traps having high voltage killing mechanisms for pests such as mice and rats are being monitored, activation of a trap does not, in all cases, mean that the trap requires servicing because the rodent may have avoided electrocution and escaped. Rearming traps such as those disclosed in U.S. Pat. No. 6,836,999 are very beneficial as these traps are able to automatically rearm if, following a killing cycle, the trap detects an impedance indicating that a rodent is not in the trap. However, these traps still require a user to be in physical proximity to the trap in order to observe visual indicators to determine trap activation status.

Therefore, a need exists for a system and method that enables rodent traps to be monitored remotely, eliminating the costly and time consuming task of going on-site to check individual traps to see whether or not they have been activated. A need also exists for a remote monitoring and reporting system and method in which electronic traps with high voltage killing mechanisms that have been activated, but without killing a rodent, do not provide the user with a "false positive" status notification, i.e., a notification that the trap contains a dead rodent when, in fact, the trap may have been activated by an environment condition, such as moisture. It would be further advantageous if traps of this type, following activation and rodent escape, could automatically rearm and continue in an active state without the need for any user action, either proximal or remote, while providing a remote user with a notification of trap activation status only when actually warranted.

SUMMARY OF THE INVENTION

Accordingly, the present invention is directed to a remote notification electronic rodent trapping system. The system includes one or more electronic rodent trapping devices having wireless communication and networking capabilities, and a base station in communication with the trapping devices to enable the status of the traps to be remotely monitored.

Each trapping device is equipped with an RF transceiver that enables the trapping device to wirelessly communicate with the base station. According to one illustrated embodiment, the base station is a PC having a separate USB transceiver which is attached to the PC and configured to receive RF transmissions. The PC has a program that exchanges information with a website, referred to herein as "the remote notification website", which is dedicated to operational control of the remote notification electronic rodent trapping system of each user. The software is transparent to the user, running in the background, and acts to forward information to the remote notification website.

In the first illustrated embodiment, a plurality of trapping devices are in communication with the PC and with each other. Each of the electronic rodent trapping devices includes a control circuit with a module having an embedded Synapse Network Application Protocol (SNAP®) network operating system that enables the device to communicate with the other trapping devices via the transceiver. The SNAP® operating system, developed by Synapse Wireless®, Inc., of Huntsville, Ala., will be described more fully hereinafter.

The PC, when connected to the Internet, accesses the remote notification website and exchanges information therewith. Computer devices other than a PC can also be used to access the remote notification website and monitor the remotely located electronic rodent trap systems. Accordingly, while use of a "PC" is described herein, it is understood that this term is intended to include other computing devices such as a MAC, tablet, smart phone, etc., that are capable of accessing the Internet in the manner described herein.

According to the machine-to-machine communication system, the trapping devices form a peer-to-peer network in which the trapping devices communicate with one another and with the PC. The trapping devices, also referred to herein simply as "traps", also act as repeaters so that if one trap loses connectivity with the PC, information from that trap can be transmitted to the PC via another trap. In addition, because the traps communicate with and through each other, the range over which traps may be distributed is increased as traps that are outside the range of direct communication with the base station can communicate with the base station via one or more intervening traps. The user can monitor trap status, battery life and signal strength by accessing the remote notification website with the PC. The software running at the remote notification website is capable of sending email and text notification to any on-line PC over the Internet, or to any device capable of receiving a text message, when trap status has changed.

According to a second illustrated embodiment, the PC can be loaded with SNAP®. Using the SNAP® embodiment, the PC is loaded with software that can receive/display information from, and send information to, the trapping devices.

The SNAP® software and related features are disclosed in U.S. Pat. Nos. 7,790,871 and 8,204,971, the disclosures of which are hereby expressly incorporated by reference as if fully set forth in their entirety.

The trapping devices, according to the SNAP® machine-to-machine communication system installed on the PC, form a peer-to-peer network as in the first embodiment in which the trapping devices communicate with one another and with the PC. The user can monitor trap status, battery life and signal strength directly from the PC. If the PC has Internet connectivity, the software is capable of sending email and text notification to another PC or cell phone over the Internet when trap status has changed.

According to another embodiment, rather than having the plurality of traps form a peer-to-peer network in which the trapping devices communicate with one another and thereby themselves act as repeaters, the system may be configured such that the traps each report independently of the other traps in the system without meshing with one another. By eliminating the need for the traps to form a mesh arrangement, each trap's battery life is conserved and other benefits are achieved.

For greater range of coverage, the direct reporting system may be configured to include a base station, a plurality of traps and a plurality of separate repeating devices, referred to herein simply as "repeaters". The base station performs in the same manner as already described in connection with the earlier embodiments, communicating trap status received from the traps to the remote notification website. However, when one trap receives a message from another trap providing status information relating to the transmitting trap, the receiving trap does not act upon the status information received. Instead, a first repeater within range of the transmitting trap, upon receiving the message containing trap status information, repeats the message. Other repeaters within range of the first repeater receive the message from the first repeater and they, in turn, repeat the message. In this way, the range over which a message may be sent is greatly increased as the repeating of messages by a first repeater to one or more adjacent repeaters spreads the message from the first repeater to a second repeater and then to a third repeater, and so on. Multiple repeaters in a row or across the same area will repeat any messages they hear and, if the base station is in range of any of the repeaters, the base station will forward the trap status information to the remote notification website. Through the use of repeaters, the size of the system may be greatly increased and, because the traps do not mesh with one another, which requires longer "awake" periods, the battery life of the traps is significantly increased as will be discussed more fully hereinafter.

The remote notification electronic rodent trapping system according to the present invention is designed to work effectively with the rearming electronic killing traps disclosed in U.S. Pat. No. 6,836,999 ("the '999 patent") which is also owned by the assignee of the present invention and hereby expressly incorporated by reference as if set forth in its entirety.

When used with the rearming electronic killing traps disclosed in the '999 patent, the traps include a microcontroller chip with a high voltage circuit for generating and delivering a high-voltage pulse train to a pair of killing plates. With the circuit in an armed or set state, a killing cycle is triggered when a triggering condition, such as a known impedance consistent with a rodent, is sensed across the killing plates, placing the trap in a kill alert state. During or upon completion of the killing cycle, the trap waits a first predetermined period of time before sending an activation notification of the kill alert state to the base station. After the killing cycle, the trap send an activation notification to the base station indicating that the trap is in the kill alert state and confirms the continued presence of the rodent indicating a kill.

The base station, upon receipt of the activation notification, forwards the message to a server in the cloud. The cloud server updates the user interface to indicate that the trap has changed from the set state to the kill alert state but then waits a second predetermined period of time before sending an email, text or other notification to a remotely located user. If the trap detects that an impedance across the killing plates increases or has increased to that of an open circuit, likely meaning no rodent is present, the trap automatically rearms itself and sends a rearming notification to the base station that the trap has returned to the set state. The base station forwards the notification to the cloud server which updates a user interface. If the cloud server receives the rearming notification from the base station prior to expiration of the second predetermined time period, the cloud server updates the user interface to show that the trap is back in the set state indicating that the trap has rearmed and does not send an alert to the remote user. If the cloud server does not receive a notification from the base station indicating the trap has returned to the set state within the second predetermined time period, the cloud server sends an alert to the remotely located user by email and/or text or other push notification to inform the user that the trap likely contains a dead rodent and requires servicing.

In view of the foregoing, one object of the present invention is to provide a remote notification electronic rodent trapping system with electronic rodent trapping devices having wireless remote notification capability that allows a user to monitor trap status from a remote location, eliminating the need for users to be in close proximity to an electronic rodent trap to determine whether the trap is functional or has been activated and needs servicing.

Another object of the present invention is to provide a remote notification electronic rodent trapping system and method that simultaneously monitors the status of multiple traps spaced at different locations from each other.

Yet another object of the present invention is to provide a remote notification electronic rodent trapping system in which each electronic rodent trapping device is equipped with an RF transceiver, enabling the trap to communicate with a separate USB transceiver attached to a user's PC.

Still another object of the present invention is to provide a remote notification electronic rodent trapping system in accordance with the preceding objects in which software installed on the user's Internet-connected PC transparently forwards data to a remote notification website through which the user can monitor trap status including battery life and/or signal strength. A further object of the present invention is to provide a remote notification electronic rodent trapping system in accordance with the preceding objects in which trap status may be monitored directly by a user having a smartphone with an appropriate smartphone application capable of accessing information stored at a web server over the Internet.

A yet further object of the present invention is to provide a remote notification electronic rodent trapping system in accordance with the preceding objects in which the system is embodied in accordance with one or more types of "cloud" computing.

A still further object of the present invention is to provide a remote notification electronic rodent trapping system in accordance with the preceding objects in which software running at the remote notification website is capable of sending text and email notifications to a remotely located PC, or any device capable of receiving a text message, when trap status has changed.

Still a further object of the invention to provide a remote notification electronic rodent trapping system in accordance with the preceding objects in which electronic rodent trapping devices form wireless nodes that create a mesh network providing machine-to-machine communication.

Still another object of the present invention is to provide a remote notification electronic rodent trapping system in accordance with the preceding objects in which the traps act as nodes that communicate wirelessly with one another, automatically auto-forming a peer-to-peer network that repairs itself if one of the traps/nodes is removed or damaged.

Yet another object of the present invention is to provide a remote notification electronic rodent trapping system according to a second embodiment in which software is installed on the user's PC that allows the user to monitor trap status, battery life and signal strength from the PC.

A further object of the present invention is to provide a remote notification electronic rodent trapping system in accordance with the preceding object in which the software, when installed on a PC having internet connectivity, is capable of sending text and email notifications to a remotely located PC or cellular device when trap status has changed and/or to log and store trap status changes and make this information accessible to a user who logs onto the internet and the trap status website through a user interface.

A still further object of the present invention is to provide a remote notification electronic rodent trapping system in which the electronic rodent trapping devices are configured to communicate with an Ethernet device with internet connection which sends updates to the website, eliminating the need for a PC.

Yet a still further object of the present invention is to provide a remote notification electronic rodent trapping system in which the electronic rodent trapping devices are configured to communicate with a cellular device which sends updates to the website, eliminating the need for a PC.

Another object of the present invention is to provide a remote notification electronic rodent trapping system that includes a base station and a plurality of traps in which the traps do not form a mesh with one another but instead either report directly to the base station individually or rely on one or more repeaters for relaying trap status information from the trap to another repeater and/or to the base station.

Yet another object of the present invention in accordance with the preceding object is to provide a direct reporting remote notification electronic rodent trapping system in which each repeater, upon receiving a message with trap status information, repeats the message so the message may be effectively transmitted a great distance as a first repeater repeats the message which is received by a second repeater, the second repeater receives and repeats the message which is, in turn, received by a third repeater which repeats the message, and so on.

A further object of the present invention in accordance with the preceding two objects is to provide a direct reporting remote notification electronic rodent trapping system in which the battery life of the plurality of traps is increased through elimination of the need for meshing of the traps since the process of meshing requires longer awake periods than with each trap reporting to the base station individually, either directly or through one or more intervening repeaters spaced between the trap and the base station.

Yet a further object of the present invention in accordance with the preceding three objects is to provide a direct reporting remote notification electronic rodent trapping system in which greater range is obtained through the inclusion of repeaters, which are supplied with a continuous power source and can be used to repeat the trap status information to one another and to the base station as described herein.

A still further object of the present invention in accordance with the preceding four objects is to provide a direct reporting remote notification electronic rodent trapping system in which the repeaters are always awake and in which each repeater, upon receipt of a trap status message, repeats the message only once.

Yet a still further object of the present invention in accordance with the preceding five objects is to provide a direct reporting remote notification electronic rodent trapping system in which the addition of more traps to a system does not increase the amount of awake time for any of the traps since the traps do not mesh up with one another but instead each trap reports its status individually and then goes back to sleep.

Another object of the present invention is to provide a direct reporting remote notification electronic rodent trapping system in accordance with the preceding six objects in which the system is embodied in accordance with one or more types of "cloud" computing, and/or is software installed on the user's Internet-connected PC transparently that forwards data to a remote notification website through which the user can log on and monitor trap status through a user interface, or trap status may be monitored directly by a user having a smartphone with an appropriate smartphone application capable of accessing information stored at a web server over the Internet.

Still another object of the present invention is to provide a direct reporting remote notification electronic rodent trapping system in accordance with the preceding seven objects in which software running at the remote notification website is capable of sending text and email notifications to a remotely located PC, or any device capable of receiving a text message or email, when trap status has changed.

A further object of the present invention is to provide a direct reporting remote notification electronic rodent trapping system in accordance with the preceding eight objects in which the electronic rodent trapping devices are configured to communicate with an Ethernet device having internet connection that sends updates to the website, or with a cellular device which sends information to/from the website, eliminating the need for a PC.

A still further object of the present invention in accordance with the preceding objects is to provide a system that includes an over-the-air update capability which allows new features, bug corrections or other upgrades to be loaded to the remote notification website and then downloaded to the base station and its associated traps upon user request.

Another object of the present invention is to provide a remote notification electronic rodent trapping system operative with electronically controlled animal traps with high voltage killing mechanisms including two or more killing plate that are able to detect the absence of a rodent following activation and thereafter to rearm themselves multiple times without requiring human intervention.

Yet another object of the present invention is to provide a remote notification electronic rodent trapping system with electronically controlled animal traps in accordance with the preceding object which has reduced servicing requirements through automatic rearming in the event that an absence of rodent impedance across the plates is detected after a killing cycle.

A further object of the present invention is to provide a remote notification electronic rodent trapping system with electronically controlled animal traps in accordance with the preceding two objects in which the traps wait a predetermined time period following killing mechanism activation before sending notification to the base station and, after such time period, sending such notification only if the trap has confirmed an impedance across the plates that is indicative of the continued presence of a dead rodent.

Still a further object of the present invention is to provide a remote notification electronic rodent trapping system with electronically controlled animal traps in accordance with the preceding three objects in which the base station, after receiving an activation notification from a trap, forwards the notification to a cloud server after which the cloud server waits a predetermined period of time before sending an email, text or other transmitted alert to a remote user and, if the trap rearms and notifies the cloud server via the base station prior to expiration of that time period of its rearmed status, the cloud server will not send an alert to the user regarding the trap's original activation notification.

Yet another object of the present invention is to provide a remote notification electronic rodent trapping system with electronically controlled animal traps in communication with a cloud server that updates and stores trap status information and enables a user to track and/or review this status through a user interface at any time, regardless of whether an actual email or text notification of trap activation is sent to the user by the cloud server.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a conceptual schematic of a remote notification electronic rodent trapping system in accordance with a first embodiment of the present invention.

DETAILED DESCRIPTION OF THE PREFERRED EMBODIMENTS

Figure 1A:
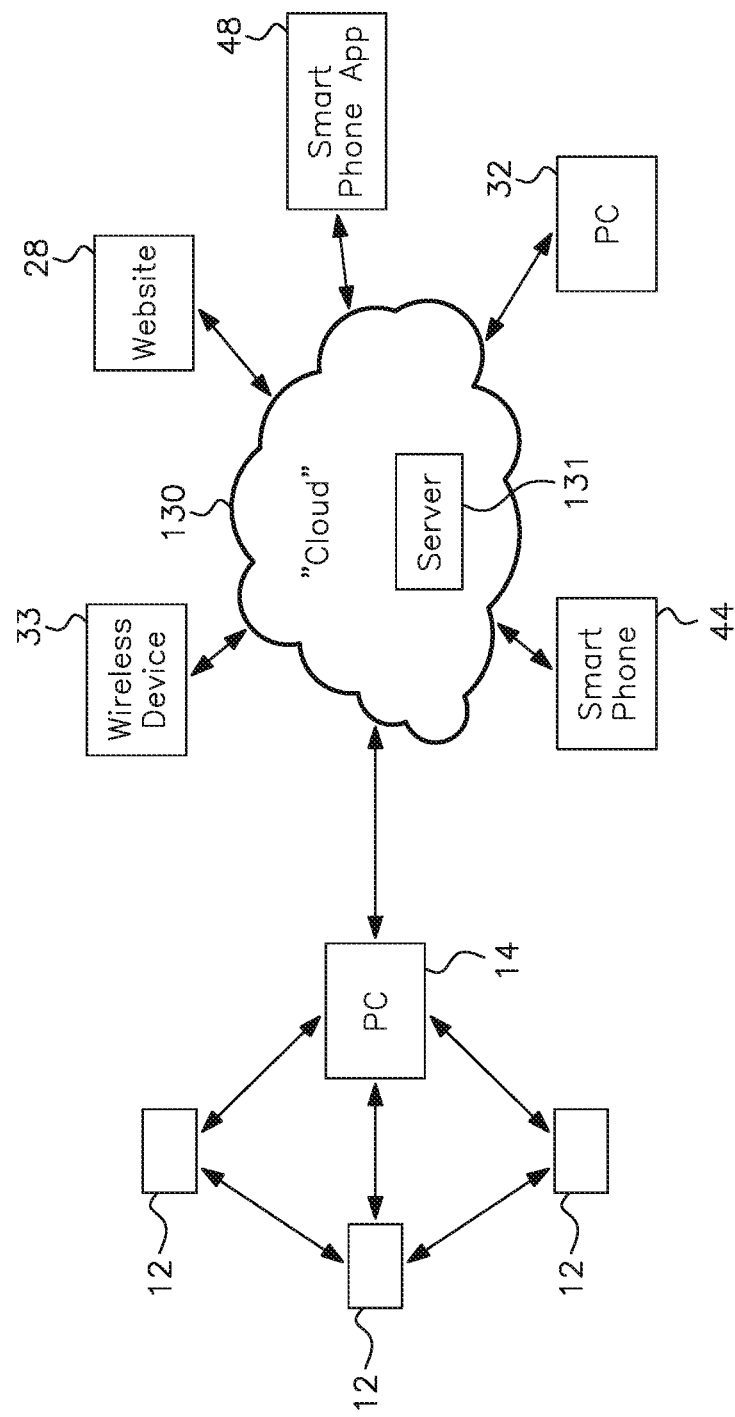
FIG. 1A is a conceptual schematic of the use of cloud computing in accordance with the remote electronic trapping system of the type shown in FIG. 1.

In describing preferred embodiments of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

As shown in FIG. 1, the present invention is directed to a remote notification electronic rodent trapping system generally designated by reference numeral 10. The system includes a plurality of electronic rodent trapping devices 12 and a base station such as PC 14. In addition to the electronic rodent trapping devices disclosed in the '999 patent, the traps may be of the types disclosed in U.S. Pat. Nos. 7,219,466; 7,690,147; and 7,757,430, all of which are owned by the assignee of the present invention and hereby expressly incorporated by reference as if set forth in their entirety. Therefore, while the rearming traps described herein refer to traps having two killing plates, the description is also applicable to traps having three (or more) killing plates, including traps with either or both mouse and rat killing capabilities.

According to the first illustrated embodiment of the present invention shown in FIG. 1, the plurality of trapping devices and the PC are configured to form a network 50 in which each of the traps communicates with the PC and preferably with other adjacent traps. The PC, when connected to the Internet 30, accesses a remote notification website 28 that coordinates the monitoring, reporting and control of the rodent trapping systems. The website is configured to send text messages to the PC 14 or other on-line smart device such as a MAC, tablet, smart phone, etc., as well as to any other device capable of receiving a text message. While the system will also work with only one trapping device and the base station, many of the capabilities described herein will not be realized in such a limited configuration. Therefore, the following description will be directed to the illustrated embodiment shown in FIG. 1 having a plurality of rodent trapping devices.

Each of the electronic rodent trapping devices 12 has an RF transceiver 18 and communicates with the PC 14 that has an RF USB transceiver 20 attached thereto to receive transmissions from the trapping devices 12. Each of the electronic rodent trapping devices includes a control circuit with a module having an embedded network operating system that enables the device to communicate with the other trapping devices via the transceiver 18. In the illustrated embodiment, the embedded network operating system is the SNAP® operating system, as will be described more fully hereinafter.

The PC 14 is provided with software that initiates forwarding of information to the remote notification website 28. The software incorporated within the present invention, including that on the PC and at the website, was developed by Exosite of Minneapolis, Minn.

The remote notification website 28, hosted by web server 24 which stores all of the trap status information, enables the user to review the content of RF transmissions received by the PC from the traps and thereby monitor trap status including one or more of whether the trap has dispatched a rodent or the trap has been deactivated, the battery life and the signal strength of each trap on the network.

In use, a plurality of electronic rodent trapping devices 12 are placed in various locations within a network area, such as in and around the user's home. According to the SNAP® protocol, the trapping devices, when powered on, automatically form a mesh network. As part of the mesh network, each trapping device communicates with every other trapping device that is within range on a peer-to-peer basis. The trapping devices act as repeaters for signals received from adjoining trapping devices so that traps that cannot communicate directly with the PC 14 due to distance or interference, can nonetheless communicate with the PC through one or more neighboring traps. If one of the traps is damaged or removed, the network is "self-healing" in that those of the remaining trapping devices that had relied upon the damaged trap as a repeater will find new communication pathways to the PC.

The transceivers 18 in the trapping devices can communicate with the PC 14 and with other trapping devices 12 in the network that are located up to approximately a quarter of a mile away when outdoors with line-of-sight. Indoor range is dependent on the number of interfering structures and/or RF signals in the network area. Testing has indicated that with standard building construction, the traps have a communication range of between about 100 to 250 feet. Again, because of the mesh configuration of the traps operating with the SNAP® operating system modules, traps that are not able to communicate with the base station directly due to interference of some sort can still provide trap status information to the base station by relaying their transmission through another trap which acts as a repeater.

To conserve battery life, the trapping devices are preferably configured to have a sleep state and an active state. The sleep state requires only low current, increasing the battery life of the trapping devices. The active state is entered at regular intervals during which the traps communicate with one another and with the PC. To ensure effective communication, all of the traps are coordinated so that their active states occur at the same time. The active state is only maintained for a set time period, after which the trapping devices return to the sleep state. The frequency with which the trapping devices enter the active state depends upon user requirements and/or preferences. One example would be that the trapping devices be set to "wake up" or enter the active state at two minute intervals. While the traps are in the active state, they send a transmission to the PC 14 and to the surrounding trapping devices if a change in trap status is detected.

The user can access the information provided by the trapping devices to the PC by logging onto the remote notification website 28 with a PC 32 or other smart device 34. For example, when a killing cycle has been performed in response to activation of the trap by a rodent, the user upon accessing the remote notification website is notified that the trap has been activated and needs to be checked and/or emptied. The remote notification website is also able to send email messages to the remote PC 32 over the Internet, as well as to any wireless device 33 capable of receiving an email message including, but not limited to, a cell phone, a smartphone, a PDA, a tablet, etc. The remote notification website 28 can also send text messages to any wireless device 35 capable of receiving a text message such as a cell phone, smartphone, pager, etc. Therefore, when certain events occur and are reported to the PC 14, such as a change in the status of one of the traps 12 including trap activation indicating a rodent has been dispatched, the PC 14 can forward this information to the web server 24 which makes the information available to the remote notification website 28. The website 28 then notifies the user by communicating over the Internet 30 to a remotely located PC 32 or other smart computing device 34 through which the user has accessed the website 28. When no activity is detected, the trapping devices enter a sleep mode that requires only low current, increasing the battery life of the trapping devices.

When sending text and/or email notification of trap status to a remote computing device, the remote notification website 28 identifies one or more specific traps which are the subject of the notification and includes at least one of a notice that a particular one of the identified traps needs to be checked, the particular trap's battery life and the particular trap's signal strength. The user is therefore able to avoid unnecessary trap checks and rather to attend to only those traps requiring service.

As also shown in FIG. 1, the web server 24 may also be directly accessed by a user having a smartphone 44 with an appropriate smartphone application ("smartphone app") 48. The smartphone app 48 can access the web server 24 in the same way that the website 28 accesses the server 24. The smartphone app 48 pulls data from the server 24 and displays it to the user via the app 48 in the same way that the website 28 pulls data from the server 24 and displays that data to the user via a web page.

As shown in FIG. 1A, the remote notification electronic rodent trapping system may also be embodied in accordance with one or more types of cloud computing 130 including one or more cloud servers 131 and a user interface 132, in which cloud providers manage the infrastructure and platforms on which one or more applications run, as would be understood by persons of ordinary skill in the art.

Figure 2:
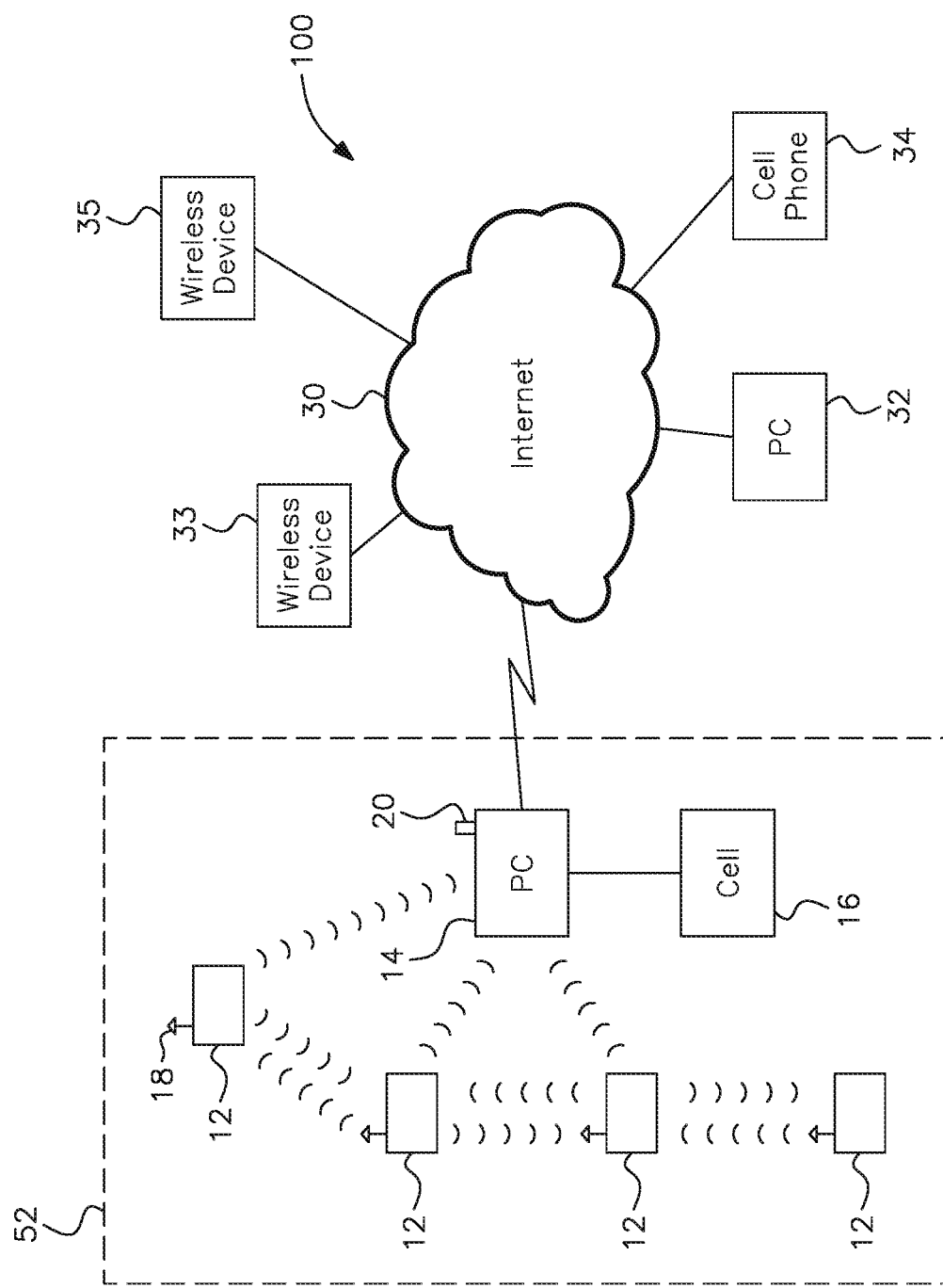
FIG. 2 is a conceptual schematic of a remote notification electronic rodent trapping system in accordance with a second embodiment of the present invention.

According to a second embodiment shown in FIG. 2, SNAP® software may be loaded on the PC 14 to enable the PC to communicate trap status data to a smart device such as cell phone 16 that is on the local network 52. The PC, when connected to the Internet 30, is able to send email messages to a remote PC 32 or text messages to a cellular device 34 that is outside the network area. Any device capable of receiving email or a text message, such as wireless devices 33 and 35, may be notified in the same way. Therefore, when certain events occur and are reported to the PC 14, such as a change in the status of one of the traps 12, the PC 14 can notify the user by communicating with the cellular device 16 and/or other remotely located PCs and mobile wireless devices over the Internet. When a trap is activated, indicating a rodent has been dispatched, the trap wakes up and sends a notification to the PC 14 immediately.

Figure 3:
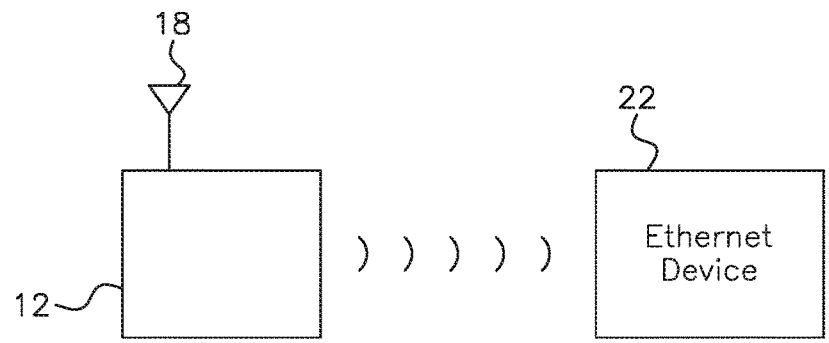
FIG. 3 is a conceptual schematic of a third embodiment in which the electronic rodent traps communicate with an Ethernet device having internet connection to send updates to a website.
Figure 4:
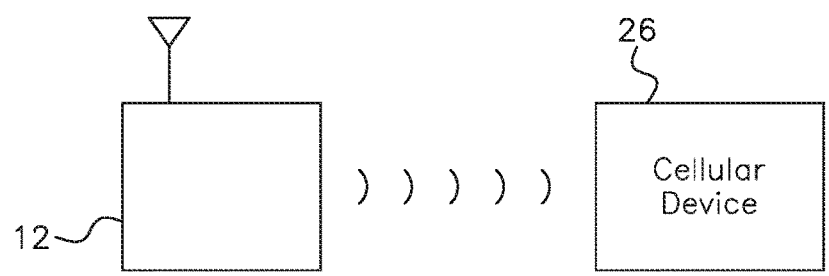
FIG. 4 is a conceptual schematic of a fourth embodiment in which the electronic rodent traps communicate with a cellular device which sends information to/from a website.

As an alternative to using a PC 14 as the base station computing device, a plurality of electronic trapping devices 12 configured in accordance with the present invention may form a mesh network that communicates with an Ethernet device 22 having internet connection that acts as the "base station" for sending updates to the website, as shown in FIG. 3. Similarly, the trapping devices 12 may communicate with a cellular or "smart" device 26 acting as a "base station" and sending information to/from the website, thereby eliminating the need for a home PC, as shown in FIG. 4. As used herein, the term "computing device" is intended in its broadest sense and includes a PC, an Ethernet device and a cellular or "smart" device.

In use, the system according to the present invention provides a method for remote monitoring of an electronic rodent trapping device from a base station. The method includes providing the electronic trapping devices with an RF transceiver configured to send RF transmissions containing trap status data, and a base station computing device configured to receive the RF transmissions at a distance from the trapping device. The electronic rodent trap sends a transmission containing trap status data which is received by the base station computing device. The base station computing device then is able to notify a user of the trap status data contained in the RF transmissions.

According to the first embodiment, the step of providing notification can include having the user log onto a remote notification website dedicated to monitoring and reporting on remote electronic trap network systems as described herein. Once connected to the website 28, the PC forwards trap information to the web server 24 which stores the trap status information. By accessing the website 28, the user can review the trap status information from a remotely located PC or other smart device used to access the website. The step of providing notification can also be performed by a user with a smartphone 44 having an appropriate smartphone app 48 which accesses the web server 24 directly. The remote notification website and server 24 can also send a text or email notification to any remote device capable of receiving text messages (such as cell phones, smartphones, pagers, etc.) or email (such as cell phones, smartphones PDAs, tablets, etc.), and display the trap status data on a display of the remote device.

According to the present invention, the method includes providing a plurality of electronic trapping devices, each having an RF transceiver and configured to send RF transmissions containing trap status data to the base station computing device and preferably to each other. The plurality of electronic trapping devices auto-form a mesh network in which the traps send RF transmissions to the base station either directly or through another trapping device in the mesh network acting as a repeater.

The formation of a network of wirelessly communicating electronic rodent trapping devices and a base station as described herein eliminates the need for the user to physically check each trapping device on a regular basis in order to determine whether or not each trap is operational, contains a dispatched rodent, etc., a process which is time consuming and costly. With the present invention, the user is able to easily remain apprised of the status of a plurality of electronic trapping devices and even to receive trap status information over the Internet using a PC or cellular device. Further, the machine-to-machine communication relied upon in the mesh network created by the present invention makes the system very robust so as to be able to continue functioning effectively for remote monitoring even if one of the traps becomes unavailable.

Figure 5:
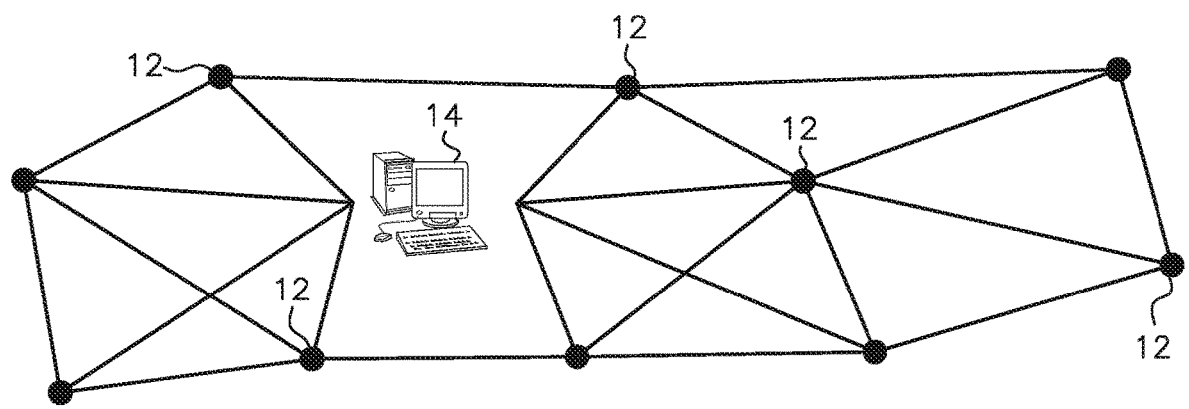
FIG. 5 shows a mesh reporting configuration of multiple traps and a base station in accordance with the present invention.

While the meshing arrangement shown in FIG. 5 provides a very robust system, meshing of the traps requires all of the traps to wake up at the same time, report, and fall asleep at the same time. To ensure there are no collisions while communicating, or that the probability of collision is very low, the traps need to stay awake a certain length of time. This length of time increases as the number of traps increases. Hence, the more traps that are added to the system, the greater the awake period required, and the higher the battery drain on each trap per report.

Figure 6:
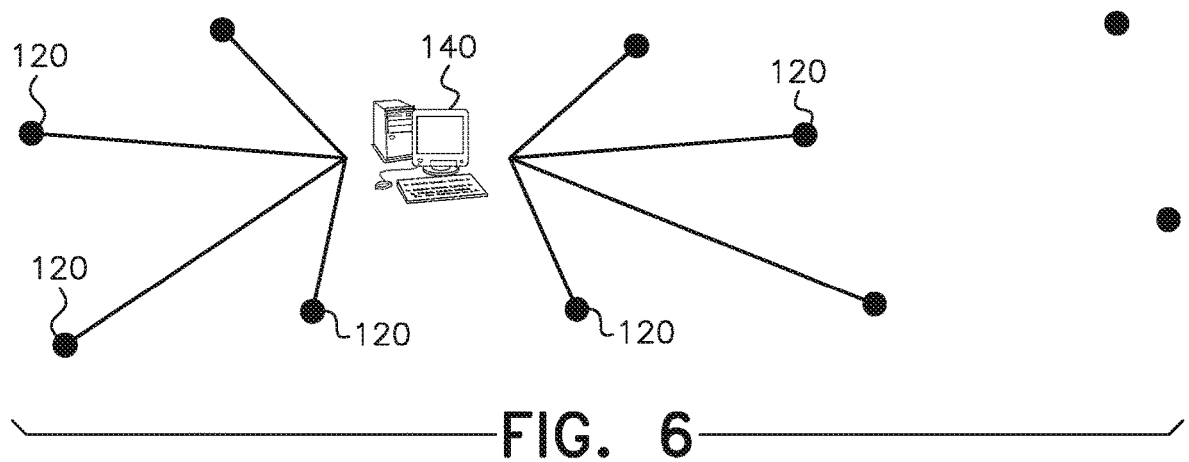
FIG. 6 shows a direct individual trap reporting configuration of multiple traps and a base station in accordance with an alternative embodiment of the present invention.

To conserve battery life, the system of the present invention may alternatively be configured so that each of the traps 120 in the remote notification electronic rodent trapping system reports individually without forming a mesh network with the other traps 120, as representatively shown in FIG. 6. Unlike the previous embodiments, the plurality of traps 120 in the direct individual trap reporting system do not form a peer-to-peer network in which the trapping devices communicate with one another and thereby themselves act as repeaters. To the contrary, the traps do not respond to trap status information received from adjoining traps but operate individually, awaking and transmitting their status, and then going back to sleep without regard to whether trap status information from another trap was "heard" while in the awake state. Eliminating the need for the traps 120 to form a meshing arrangement significantly reduces the amount of time the traps must be "awake". More particularly, through the use of individual reporting, each trap must only be "awake" long enough to report and can then return to its "sleep" mode. Each individual trap may report directly to the base station 140 as shown in FIG. 6, or may report through repeaters as will be described further hereinafter. Traps may be configured to wake up and report on a periodic basis. In addition, when a trap is activated, indicating a rodent has been dispatched, the trap wakes up and sends a notification to the PC 14 immediately.

Unless specifically stated herein, all of the capabilities of the mesh configuration are also available in the direct reporting configuration. Therefore, as in the meshing embodiments, the base station 140 in the direct reporting system may be one of a plurality of different computing devices such as, but limited to, a PC, an Ethernet device having internet connection, or a cellular or "smart" device which sends information to and from the website. The direct reporting remote notification electronic rodent trapping system may also be embodied in accordance with one or more types of "cloud" computing, and/or with software installed on the user's Internet-connected PC that forwards data to a remote notification website through which the user can monitor trap status. Trap status may also be monitored directly by a user having a smartphone with an appropriate smartphone application capable of accessing information stored at a web server over the Internet. The direct individual trap reporting system may include software running at the remote notification website that is capable of sending text and email notifications to a remotely located PC, or any device capable of receiving a text message, when trap status has changed.

Figure 7:
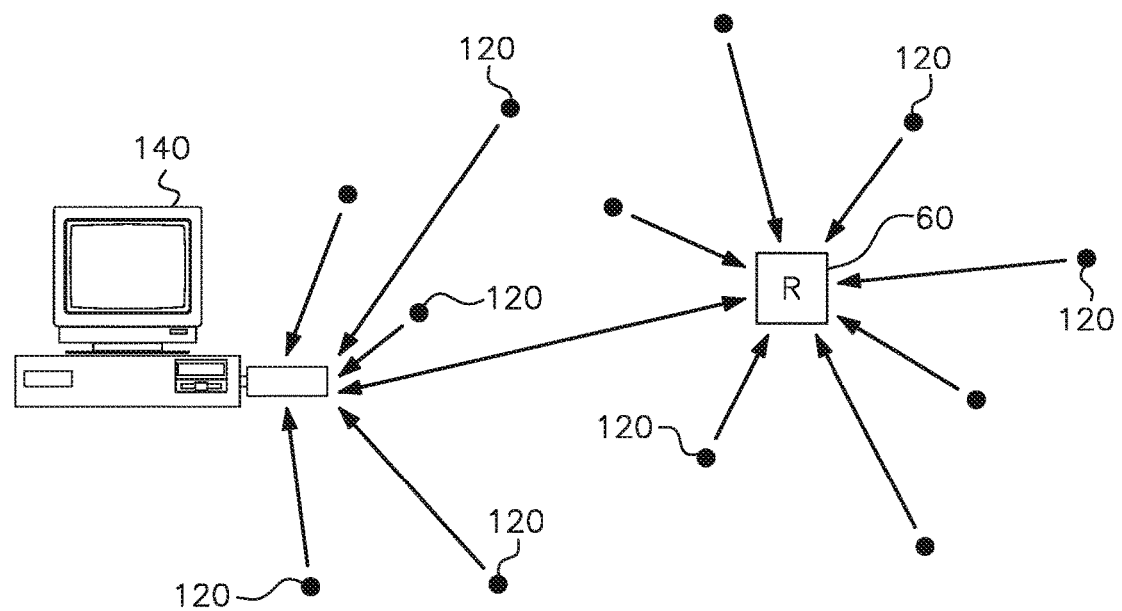
FIG. 7 is an illustration of the addition of repeaters to the direct individual trap reporting system shown in FIG. 6.

For large systems such as in commercial spaces, the effectiveness of direct individual trap reporting may be further enhanced by adding repeating devices 60 to the remote notification electronic rodent trapping system as shown in FIG. 7. The repeating devices greatly increase the range over which the remote notification system may communicate. As with direct reporting of the traps 120 to the base station 140, when using repeaters 60 the awake time of the traps does not need to be increased as more traps are added to the system because neither the traps nor the repeaters mesh up. Instead, the repeaters stay on and each trap simply awakes, reports its status individually, and then goes back to sleep. As stated previously, the terms "repeating devices" or "repeaters" used herein refer to devices that receive a message and then, in turn, transmit the message received. As used herein, the phrase "direct reporting" is intended to include both those configurations in which each trap individually reports trap status directly to the base station and those configurations in which each trap reports trap status individually, but the trap status message transmitted by the trap reaches the base station via the retransmission of the trap status message by one or more repeaters positioned between the reporting trap and the base station.

Unlike the traps, the repeaters 60, which may include a USB dongle or a stand-alone plug-in device, are supplied with a continuous power supply. For example, the dongles may be of the type that may be plugged into the base station or powered by a 5V power supply such as a cell phone charger. The dongle and power supply may be separate or built as a single device.

In operation, when passing the trap status information to the base station 140 from a plurality of traps 120 over a greater distance, a plurality of repeating devices 60 are used. One or more first repeaters receive a message containing trap status information from a trap. The designation "first" is used to denote that the subject repeaters are the first to hear a trap's transmission. Upon receipt of the trap message, each of the first repeaters repeats, i.e., retransmits, the message. Other repeaters, referred to as "second repeaters" for ease of explanation without denoting any difference in structure from the "first" repeaters, upon hearing the message transmitted by the "first" repeaters, repeat the message themselves. Repeaters out of range from the reporting trap, referred to as "third" repeaters for the same ease of explanation, but in range of the "second" repeaters, in turn repeat the message to reach "fourth" repeaters that are even further away from the trap. Through the relay effect of the distributed repeaters 60, the total system range over which trap status information may be communicated is greatly expanded. When, at any time during the ongoing and outwardly spreading repeating process, the base station 140 also hears the message, the base station forwards the trap status information to the remote notification website 28 (see FIG. 1).

Because dongles have a continuous power supply, battery life is not an issue for the repeaters. As already noted, repeaters are always awake. When a trap wakes up, the trap communicates to any repeater and/or base station in range. If a repeater hears the message, whether from the trap or another repeater, the hearing repeater repeats the message. Any repeaters which hear the original message or the repeated message will also repeat. However, a repeater will repeat each message only once, so that the same message is not repeated twice.

Given that each repeater, upon receiving a message with trap status information, repeats the message, the message may ultimately be repeated by a large number of repeaters. With each repetition, the message moves further from the originally transmitting trap, enabling the message to be effectively transmitted a great distance. For example, as a first repeater repeats the message which is received by a second repeater, the second repeater receives and repeats the message. The repeated message is, in turn, received by a third repeater which repeats the message, and so on.

Figure 8:
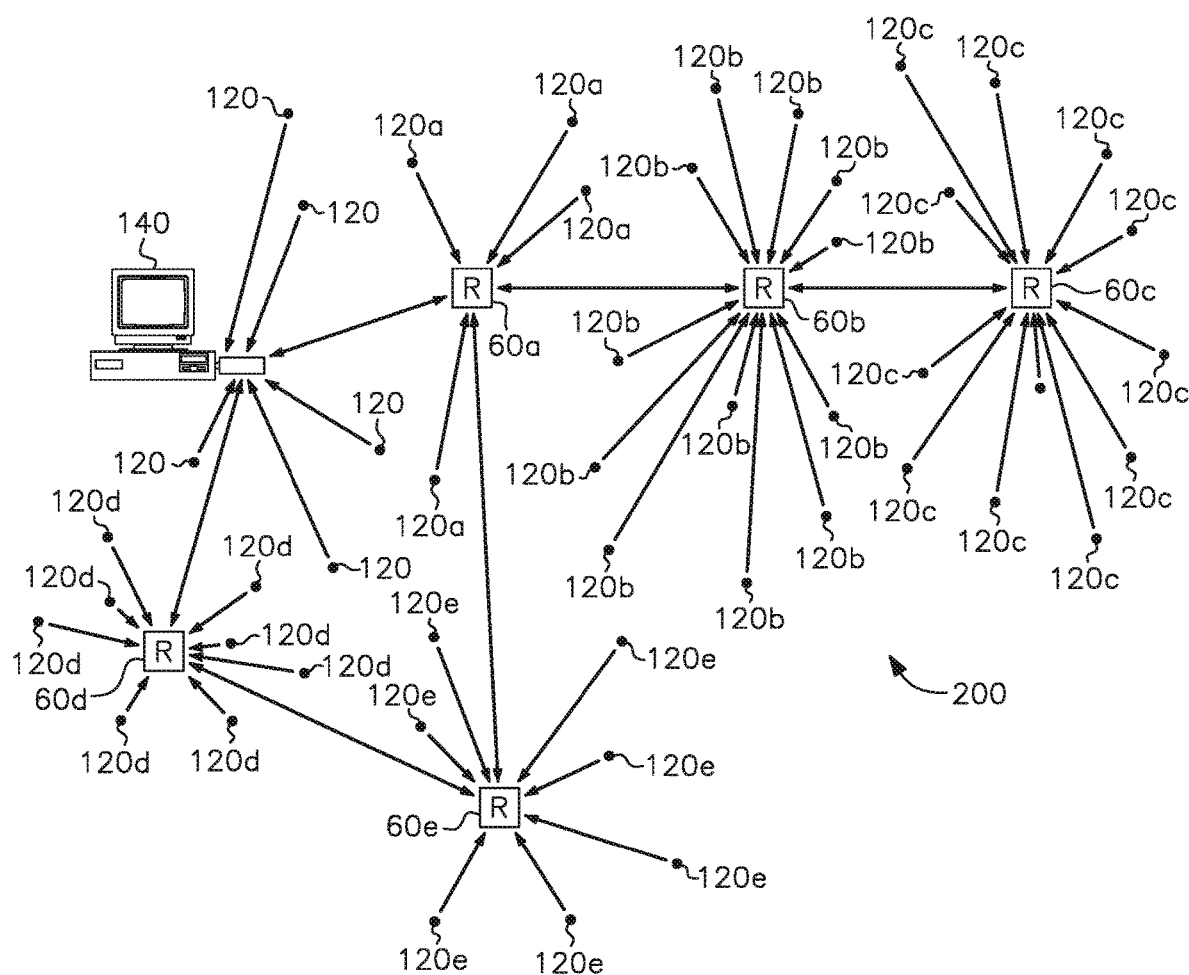
FIG. 8 is an illustration of a large individual trap reporting system in accordance with the present invention, having a plurality of traps and a plurality of repeaters communicating with a base station.

FIG. 8 is representative of a large commercial direct reporting electronic trap system, generally designated by reference numeral 200, in accordance with the present invention. The system includes a base station 140; a plurality of repeaters 60a, 60b, 60c, 60d and 60e; and a plurality of traps 120, 120a, 120b, 120c, 120d and 120e. The plurality of traps in the immediate range of the base station 140 are designated by reference numeral 120. The plurality of traps within range of repeater 60a are designated by reference numeral 120a, the plurality of traps within range of repeater 60b are designated by reference numeral 120b, the plurality of traps within range of repeater 60c are designated by reference numeral 120c, the plurality of traps within range of repeater 60d are designated by reference numeral 120d, and the plurality of traps within range of repeater 60e are designated by reference numeral 120e.

Traps 120 communicate directly with the base station 140 without need of a repeater. Whether or not repeaters 60a, 60b, 60c, 60d or 60e are designated "first" repeaters, "second" repeaters, "third" repeaters, etc. is determined on the basis of the trap currently reporting. For example, if one of traps 120c reports, then repeater 60c is a "first" repeater, being the first to receive the message from the trap 120c. Repeater 60c repeats the message upon receipt, with the message, in turn, being received and repeated by repeater 60b, repeater 60b acting as a "second" repeater. Repeater 60b repeats the message which is then received by repeater 60a, with repeater 60a in this example acting as a "third" repeater. When repeater 60a repeats the message, the message is then received by the base station 140.

If one of traps 120b reports, then repeater 60b is a "first" repeater, being the first to receive the message from the trap 120b. Repeater 60b repeats the message upon receipt, with the message, in turn, being received and repeated by repeater 60a, repeater 60a acting as a "second" repeater. The message sent from second repeater 60a will then be received by the base station 140.

In the above example, when first repeater 60b repeats the message from trap 120b, repeater 60c will also receive the repeated message and will repeat the same. Hence, in this case repeater 60b will receive the same message twice—the first time from trap 120b and the second time from repeater 60c when repeater 60c repeats the message it received from repeater 60b. Repeater 60b will recognize that the message received from repeater 60c is the same message as that already received from trap 120b and repeated in response thereto. Therefore, repeater 60b will not repeat the same message again.

In a similar manner, if one of traps 120a reports, then repeater 60a is a "first" repeater, being the first to receive the message from the trap 120a. The base station 140 will receive the message when repeated by repeater 60a.

As in the previous example, when first repeater 60a repeats the message from trap 120a, repeater 60b will also receive the repeated message and will repeat the same. Hence, in this case repeater 60a will receive the same message twice—the first time from trap 120a and the second time from repeater 60b. Repeater 60a will recognize that the message received from repeater 60b is the same message as that already received from trap 120a and repeated. Therefore, repeater 60a will not repeat the same message again. In addition, when repeater 60b, acting as a "second" repeater, repeats the message received from repeater 60a, repeater 60c will also receive that message and repeat the same. The message repeated by repeater 60c will be received by repeater 60b, but repeater 60b will not repeat the message a second time, recognizing that the message received from repeater 60c is the same message as that already received from repeater 60a and already repeated in response to thereto.

The same operation occurs with repeaters 60d and 60e, repeater 60e being a "first" repeater and repeater 60d being a "second" repeater for traps 120e, and repeater 60d being a "first" repeater for traps 120d. When repeater 60d repeats a message received from one of traps 120d, repeater 60e will hear and repeat but repeater 60d, upon receiving the message from repeater 60e, will not repeat the same message a second time.

In the same way, should the base station 140 receive the same message more than once, the base station 140 will recognize the redundancy and will ignore all duplicative messages received after the first receipt of a given message.

By adding repeaters and traps, the system shown in FIG. 8 may be enlarged to include as many as 100 traps and possibly more, all reporting to a single base station 140.

The present invention also includes an over-the-air update capability which allows new features, bug corrections or other trap upgrades to be loaded to the remote notification website. Once loaded on the website, a user's portal or internet interface will show that an update is available. By the user pressing a button, or using another input mechanism, the next time a trap reports its status to the base station, the update will be loaded to the trap. The over-the-air update feature may be used in conjunction with both the trap mesh network embodiments and the direct individual trap reporting embodiments of the present invention.

Figure 9:
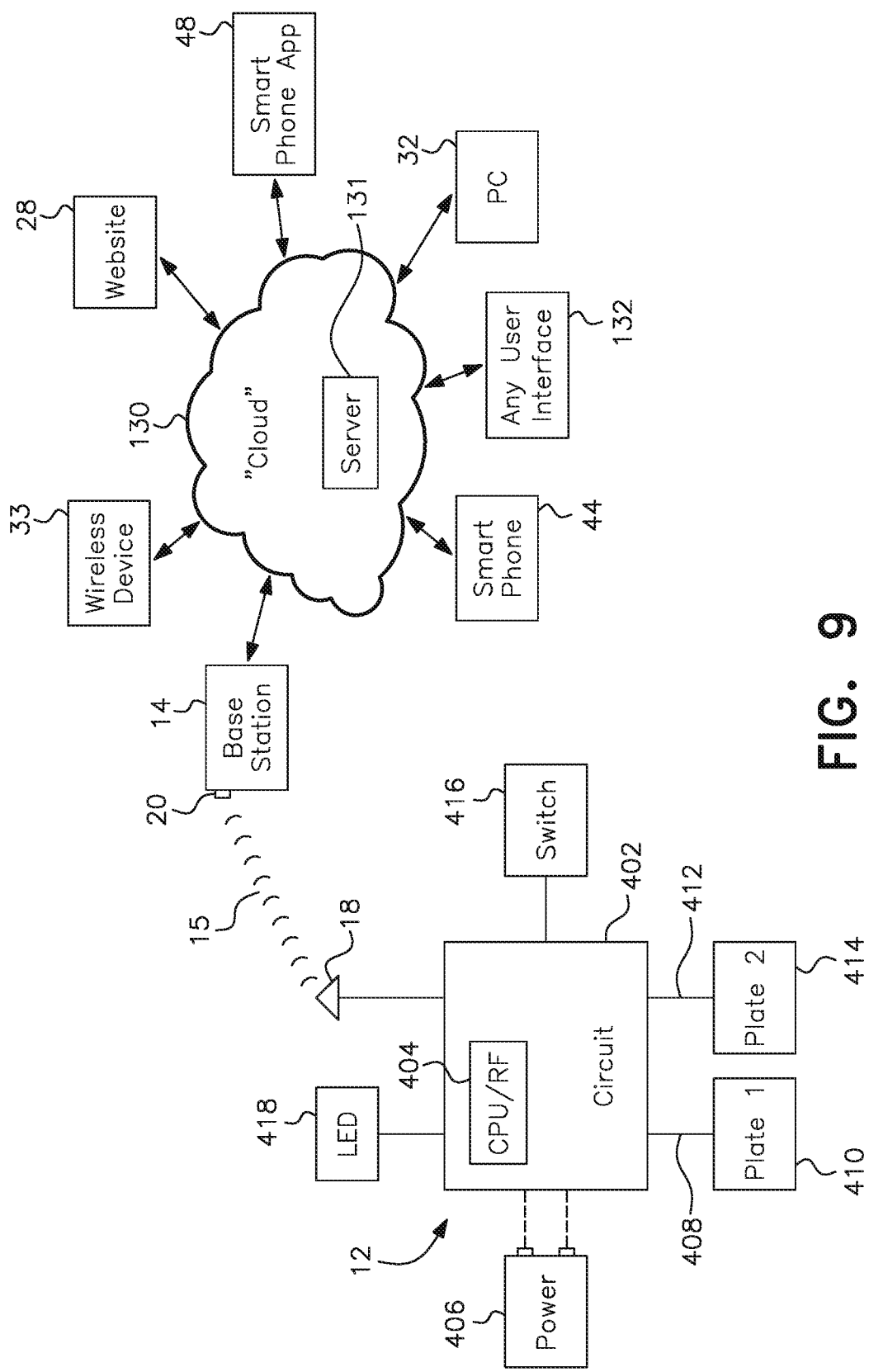
FIG. 9 is a block diagram of a high-voltage, rearming electronic trap implemented within the remote notification system in accordance with the present invention.

FIG. 9 depicts a block diagram of the system of the present invention with an electronic trap 12 having rearming capability substantially as disclosed in the '999 patent with modifications to work with the remote monitoring system of the present invention. The rearming circuit includes a high-voltage output circuit 402 controlled by an integrated central processing unit/radio frequency (CPU/RF) module 404 electrically connected to a power supply 406. A first electrical connection member 408, which may be embodied as a wire, receives current from the high-voltage output circuit 402 and also connects to a first plate 410 so that electricity can be provided thereto. A second electrical connection member 412, which may also be a wire, connects the high-voltage output circuit 402 to a second plate 414. The circuit is activated by a switch 416 accessible from the exterior of the trap and adjacent an LED 418 which provides a user who may be in physical proximity to the trap with a visual indicator of trap operating status. The CPU/RF module 404 also includes components (not shown) that enable the module to send alerts and/or notifications as RF transmissions 15 to the base station 14 for remote reporting of trap operating status in the manner described herein.

When contacted by a trap that an activation has occurred and the trap has entered the kill alert state, the base station 14 forwards the trap activation notification to the cloud server 131 in the cloud 130. The cloud is connected to any one or more of wireless devices 33, websites 28, smart phone apps 48, PCs 32, smart phones 44 and other user interfaces 132. While specific types of interfaces are shown in FIG. 9 in addition to the user interface 132, it is understood that the user interface 132 is intended to include both these and other devices that can communicate with the cloud by logging onto the cloud server. Therefore, when the user interface 132 is referred to, it is understood to be a term that includes all of the specific interfaces shown as well as any others designed for network communication over the internet or through cloud computing.

Figure 10:
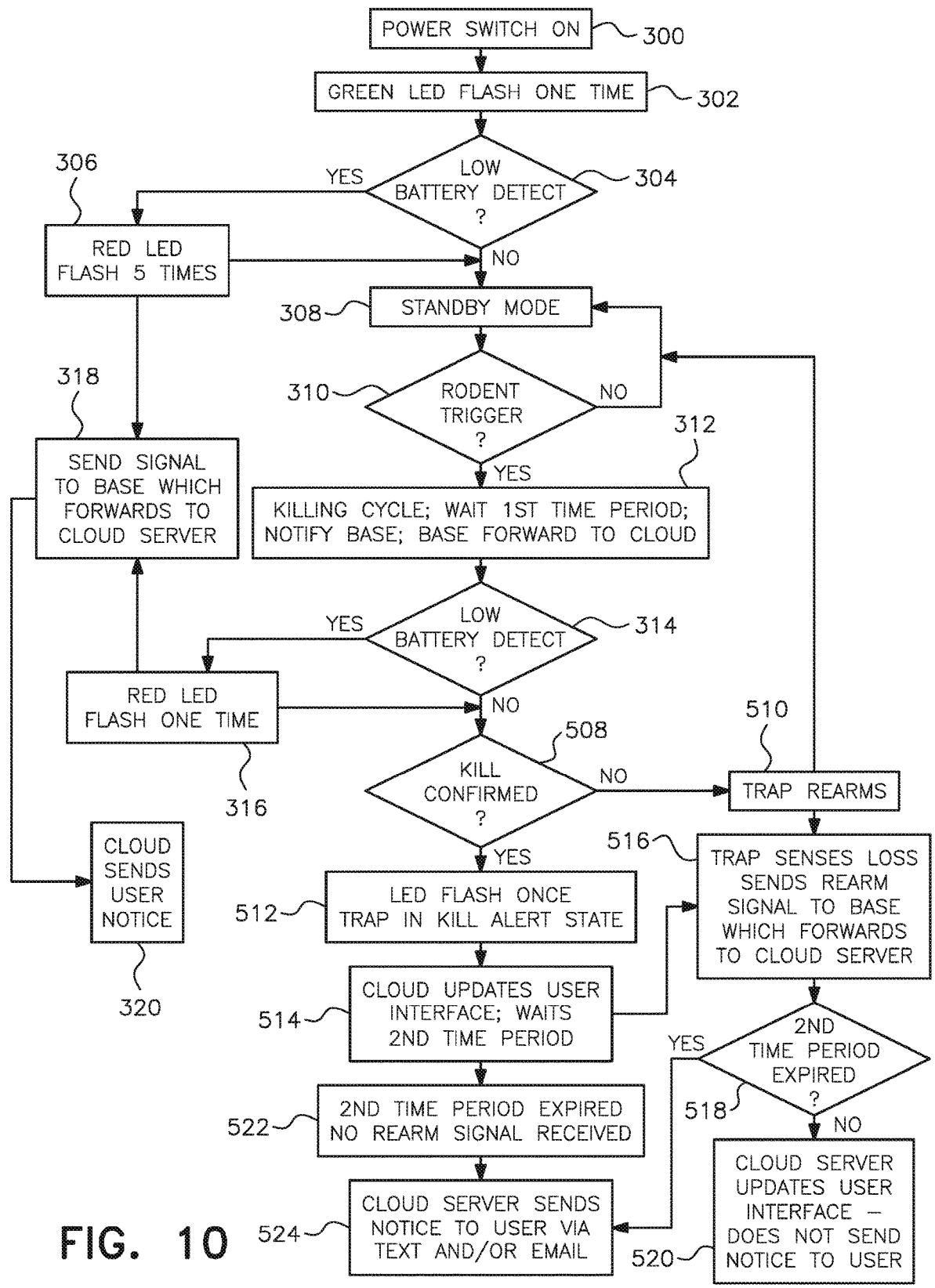
FIG. 10 is a flow chart of the operational sequence of the high-voltage rearming electronic trap in conjunction with the remote notification system of the present invention.

The operation of the rearming trap when incorporated within the present invention is set forth in FIG. 10. To commence operation of the trap, the trap is turned on to place the trap into an enabled condition or the set state, step 300. Upon entry into the set state, the LED 418 at the trap 12 flashes green once, step 302, and then turns off. The high-voltage output circuit 402 detects the battery status and, if the battery power is low, step 304, the LED flashes red one or more times, step 306, as a visual indicator to a user who may be in the proximity that the batteries should be replaced. If the battery power is low, the trap also sends a signal to the base station 14 which forwards the signal to the cloud server 131, step 318. The cloud server then notifies the user, usually by a pushed notification such as text or email, of the low battery power status, step 320. Upon conclusion of the red LED flashing procedure and notification to the base station of the battery power, if the power is found to be sufficient for trap operation, step 304, the trap remains in the enabled condition in the standby mode or set state, step 308.

When a triggering condition is detected, such as an impedance across the plates that is consistent with the presence of a rodent, step 310, the circuit 402 is automatically triggered or activated and completes a killing cycle, step 312. During and/or after the killing cycle the trap waits a first time period before sending a transmission to the base station, which the base station forwards to the cloud server, that the trap has entered the kill alert state, step 312. The first time period is dependent on the type of trap. An electronic trap designed for mice waits between 10 and 60 seconds, and preferably between about 20 and 30 seconds before checking whether a kill has been confirmed, step 508. An electronic rat trap waits between about 45 seconds and 3 minutes, and preferably between about 90 seconds and about 150 seconds before checking whether a kill has been confirmed, step 508. The first time period may be the same as the duration of the killing cycle or may include an additional time period after completion of the killing cycle before the trap sends the RF transmission to the base station indicating change in state from the set to the kill alert state.

At the end of the killing cycle, step 312, current to the plates is terminated, and the battery level is checked, step 314. As before, if the battery power is low, step 314, the LED flashes red one or more times, step 316, as a visual indicator to a user is proximity to the trap that the batteries should be replaced. If the battery power is low, the trap also sends a signal to the base station 14 which forwards the signal to the cloud server, step 318. The cloud server then notifies the user of the low battery power status, step 320.

Upon conclusion of the red LED flashing procedure and notification to the base station, if the battery power, while low, is found to be sufficient for trap operation, step 314, the trap checks for the continued existence of the target impedance across the plates to confirm a kill, step 508. If such impedance is not detected, indicating the trap may have been activated by an environmental condition such as moisture, the trap rearms, step 510, and returns to the active standby mode or set state, step 308. The trap also sends an RF transmission to the base station indicating return of the trap to the set state and the base station forwards the rearmed status of the trap to the cloud server, step 516.

If resistance is still detected after the first time period indicating the likelihood that a dead rodent is present, step 508, the trap LED flashes one or more times to visually indicate that the trap is in the kill alert state to any user who may be in proximity of the trap, step 512. The green flashing of the LED may continue until the user services the trap or for a set period of time.

Upon receipt by the cloud server of the activation notice indicating that the trap has completed a killing cycle and is in the kill alert state, the cloud server updates the user interface to indicate that the trap has gone from the set state to the kill alert state and then waits a second predetermined period of time before sending an email, text or other pushed notification to a remotely located user, step 514. If, after sending the trap activation notice to the base station, step 312, the impedance across the killing plates of the trap increases to indicate an open circuit, likely meaning no rodent is present, step 508, the trap automatically rearms, step 510, and returns to the set state or standby mode, step 308. The trap also sends a signal to the base station indicating return to the set state which the base station forwards to the cloud server, step 516. If the second predetermined time period has not expired, step 518, the cloud server updates the user interface to indicate that the trap has returned to the set state and no alert notification is sent to the remote user, step 520. The second time period may be of various lengths depending on system design to be only a few hours, such as 6-8 hours, or as many as 48 hours. While a longer time period could be used, it is not preferable for the second time period to be longer than 48 hours as it is generally desired to service the traps with some degree of promptness. A shorter period of time may also be used but may result in an increase in user notifications that may prove to have been unnecessary due to subsequent trap rearming that occurs within a relatively short time after activation. The length of the time period may also be different for different traps, being set according to the trap's intended location, environmental conditions at the intended location, the user's preferences with respect to how frequently the traps are to be checked, or other factors.

If the cloud server does not receive a rearming notification from the trap indicating return of the trap to the set state within the second predetermined time period and the time period expires, step 522, the cloud server sends an alert to the remotely located user that the trap likely contains a dead rodent and requires servicing, step 524. This alert is typically sent by a pushed notification such as text and/or email and the like. If the cloud server receives notification from the base station that the trap has rearmed after the second time period has expired, step 518, the cloud server updates the user interface to indicate the trap has returned to the set state. However, since the second time period has expired, the cloud server will have already sent a notice to the user, step 524.

Updating of the user interface by the cloud server upon receipt of notification from the base station creates a trap state data history and allows the user to obtain information on trap state and changes therein by logging onto the user interface 132 where the information is available and can be reviewed. The second time period delay before sending of a pushed notification avoids burdening the user with what could prove to be unnecessary text and email notifications if the trap rearms prior to expiration of the second time period. In any case, whether a notification is eventually sent or not, the user can review trap set and trap kill alert state changes that have occurred over a past time period by logging into the user interface for the cloud server.

When implemented with the present monitoring system, the electronic rodent traps are preferably configured so that the number of times the traps can become activated and then rearm is not limited, except by a trap operational condition that prevents rearming. Hence, traps in the field that are in communication with the monitoring system will repeatedly rearm following activation, provided the check performed following activation detects an impedance indicating the absence of a dead rodent in the trap.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

What is claimed is:

1. A remote notification electronic rodent trapping system that enables a user with a computing or other smart device to monitor status of a trapping device without having to be in physical proximity to the trap comprising:
    at least one electronic rodent trapping device having a high-voltage output circuit with least two plates and a transceiver configured to send an alert notification as a transmission following activation of the electronic rodent trapping device, activation of said trapping device including completion of a killing cycle, said trapping device waiting a delay period after activation before sending the transmission and confirming a presence or absence of a rodent after trap activation; and
    a base station in communication with said trapping device, said base station being configured to receive said transmission indicating trap activation and to record a change in trapping device state.

2. The remote notification electronic rodent trapping system as set forth in claim 1, wherein said electronic rodent tapping device automatically rearms after confirming absence of a rodent after the killing cycle.

3. The remote notification electronic rodent trapping system as set forth in claim 2, wherein said delay period corresponds with a length of the killing cycle.

4. The remote notification electronic rodent trapping system as set forth in claim 1, wherein said delay period is longer than the killing cycle.

5. The remote notification electronic rodent trapping system as set forth in claim 1, wherein said base station stores a trapping device state data history that is accessible to the user, said trapping device state data history including the activation notification.

6. The remote notification electronic rodent trapping system as set forth in claim 1, wherein said system includes a plurality of electronic rodent trapping devices configured to send transmissions containing trap status data to the base station.

7. The remote notification electronic rodent trapping system as set forth in claim 1, wherein said delay period is between about 10 and 150 seconds.

8. The remote notification electronic rodent trapping system as set forth in claim 1, wherein the base station provides an input to a user interface where the user can monitor the change in trapping device state.

9. The remote notification electronic rodent trapping system as set forth in claim 1, further comprising a server in communication with the base station, said trapping device data history being stored by said server.

10. A method of remotely monitoring an electronic rodent trapping device by a user, the trapping device having a high-voltage output circuit with at least two plates and an RF transceiver, and a base station in communication with said trapping device and with a user interface, the method comprising:
    placing said trapping device in a set state;
    initiating, by said trapping device in response to triggering condition, an activation period that includes outputting high-voltage to the at least two plates for a killing cycle;
    waiting, by the trapping device, a predetermined time period and then sending an RF transmission with an activation notification to said base station indicating the trapping device to be in a kill alert state; and
    storing a trapping device state data history that is accessible to the user through the user interface, said trapping device state data history including an activation notification history of the trapping device.

11. The method as set forth in claim 10, further comprising determining, by said trapping device after the killing cycle, whether impedance across the plates is consistent with rodent presence and, if so, remaining in the kill alert state and not rearming.

12. The method as set forth in claim 10, further comprising determining, by said trapping device after the killing cycle, whether impedance across the plates is consistent with rodent presence and, if the impedance across the plates indicates an absence of rodent presence, said trapping device rearming and notifying the base station that the trapping device has returned to the set state.

13. The method as set forth in claim 12, further comprising said base station adding the change in trapping device state back to the set state to the trapping device state data history.

14. The method as set forth in claim 10, further comprising sending an update notification to the users computing or other smart device of the kill alert state of the trapping device.

15. The method as set forth in claim 14, wherein said sending of the update notification includes sending at least one of a text and an email.

16. The method as set forth in claim 10, wherein the predetermined time period is between about 10 and 60 seconds for mice.

17. The method as set forth in claim 10, wherein the predetermined time period is between about 90 and 150 seconds for rats.

18. The method as set forth in claim 10, further comprising the user reviewing the trapping device state data history using the user interface.

19. A method of remotely monitoring an electronic rodent trapping device by a user, the trapping device having an RF transceiver, a base station in communication with said trapping device, and a server in communication with said base station and having a user interface, the method comprising:

placing said trapping device in a set state;

initiating by said trapping device in response to detection of a rodent in the trapping device, an activation period;

waiting by the trapping device, a predetermined time period;

determining by the trapping device, after the predetermined time period, whether the rodent has escaped from the trapping device or is still present, said determining including checking for an impedance consistent with a rodent across two conductive plates in the trapping device;

sending, by the trapping device, an RF transmission to said base station with a trap state indication, said indication being one of rodent presence still detected and rodent has escaped; and said base station being configured to receive said RF transmission and to forward a notification to the server of the trap state indication when rodent presence is still detected.

* * * * *